United States Patent [19]
De Boer et al.

[11] Patent Number: 5,302,183
[45] Date of Patent: Apr. 12, 1994

[54] RECOVERY OF PRECIOUS METALS FROM CATALYST RESIDUE

[75] Inventors: Gerben B. J. De Boer; Melis Hasselaar, both of Amsterdam, Netherlands

[73] Assignee: Shell Oil Company, Houston, Tex.

[21] Appl. No.: 6,395

[22] Filed: Jan. 21, 1993

[30] Foreign Application Priority Data

Jan. 23, 1992 [NL] Netherlands ............... 92200192.0

[51] Int. Cl.$^5$ .............................................. C22B 11/00
[52] U.S. Cl. ........................................ 75/426; 423/22
[58] Field of Search .......................... 423/22; 75/426

[56] References Cited

U.S. PATENT DOCUMENTS

| | | |
|---|---|---|
| 3,545,963 | 12/1970 | Wakamatsu et al. |
| 3,855,396 | 12/1974 | Kniese et al. ................ 423/417 |
| 4,218,336 | 8/1980 | Eisenbach et al. |
| 4,791,190 | 12/1988 | Van Broekhoven et al. ...... 528/483 |
| 4,822,760 | 4/1989 | Kashibe et al. |
| 4,895,595 | 1/1990 | Imatani et al. |
| 5,102,632 | 4/1992 | Allen ............................ 423/22 |

FOREIGN PATENT DOCUMENTS

| | | |
|---|---|---|
| 251467 | 8/1988 | Czechoslovakia . |
| 2262852 | 12/1972 | Fed. Rep. of Germany . |
| 80043060-B | 11/1980 | Japan . |
| 60-231630-A | 11/1985 | Japan . |
| 0186409-A2 | 2/1986 | Japan . |
| 63-196537-A | 8/1988 | Japan . |
| 63-197543-A | 8/1988 | Japan . |
| 0224304-A | 4/1984 | United Kingdom . |
| 2127001A | 4/1984 | United Kingdom . |

Primary Examiner—Peter D. Rosenberg

[57] ABSTRACT

The invention relates to a process for recovering a precious metal, particularly palladium, from a non-aqueous effluent comprising the metal and dissolved salt and/or polyether contaminants, wherein the effluent is contacted with a reduction agent, the precious metal is deposited onto a carrier, preferably comprising a combustible carbonaceous material, and the metal loaded carrier is separated from the effluent.

12 Claims, 1 Drawing Sheet

RECOVERY OF PRECIOUS METALS FROM CATALYST RESIDUE

FIELD OF THE INVENTION

This invention relates to a process for recovering a precious metal from non-aqueous effluents.

BACKGROUND OF THE INVENTION

In homogeneous catalysis, many catalyst systems comprising a precious metal find application, usually in the form of a soluble complex of the metal. Generally, homogeneous catalysis provides advantages over heterogeneous catalysis by higher reaction rates per atomic amount of metal and higher selectivities. On the other hand, heterogeneous catalysis allows for a much more easy separation of catalyst and reaction medium, whereby heterogeneous catalysts can readily be reused or used continuously. Homogeneous catalysts tend to show a shorter lifetime.

Unless the reaction product, for example being gaseous, can continuously be stripped from a stationary reaction medium, the homogeneous catalyst will pass through and leave a reactor with the reaction effluent. When using a stripping reactor, usually side reactions will proceed that lead to the formation of non-volatile substances, for which reason application of a reactor bleed is necessary to prevent accumulation of these non-volatiles in the reaction mixture. By the bleed effluent some of the precious metal will leave the reactor.

Some catalysts constitute stable precious metal complexes and may be readily extracted from the reaction effluent for recycle, if a solubilizing fluid immiscible with the reaction medium is available. Some other catalysts can readily be reconstituted from their precursors extracted from the reaction effluent. However, many catalysts are being degraded during the reaction cycle or subsequent work-up, and the reaction effluent may comprise various remnants of the precious metal catalyst with various valency states for the metal, so that recycling is not possible. In other cases the presence of excessive contaminants will preclude recycling. In view of costs of the precious metal and considering the environmentally stipulated restrictions on disposal of heavy metal-containing waste, effective recovery of the residual precious metal from the reaction effluent is of paramount importance for an economically viable process using a homogeneous precious metal catalyst.

Several methods for recovering the precious metal have already been proposed. According to Great Britain A-2127001 precious metals are rapidly and efficiently recovered from cyanide-containing leach solutions by loading onto an activated carbon fibre body, while CS-B-251467 [Chem.Abstr., 109(24): 213964y] teaches the recovery of palladium catalyst from acidified waste water by sorption on activated carbon pretreated with an alkali metal salt of EDTA. However, these methods concern aqueous waste liquids, and are not directly applicable to non-aqueous systems.

JP-A-196537/1988 and JP-A-197543/1988 disclose an adsorbent which is constituted by oxidized activated carbon loaded with organophosphorus compounds for reversible adsorption and desorption of Group VIII noble metal complexes, for example in hydroformylation reactions. This method requires specific properties of the catalytic metal complex being sufficiently stable for direct reuse, and accordingly has limited applicability. JP-A-231630/1985 discloses the use of activated carbon for the recovery of palladium compounds from the reaction effluent of the oxidative carbonylation of styrene conducted in the presence of molecular oxygen and oxidants such as ferric and cupric salts. Under such conditions the palladium is essentially present in its +2 valency state and any salts present are simple inorganic salts. It has appeared, that this method is not completely effective, if non-aqueous effluents of more complicated composition are treated.

It is also known to recover precious metal ions using an ion-exchange resin, but this method will not effect essentially complete recovery, if not all precious metal is present in the ionic state or too much of contaminants is present in the effluents to be treated.

U.S. Pat. No. 4,791,190 discloses a process for the removal of palladium catalyst residues from polymer ketones, wherein a suspension of the polymer is contacted with carbon monoxide for solubilizing and extracting the catalyst residue from the solid polymer particles.

In summary, though some processes are known for the recovery of precious metal catalysts from specific catalyst residues, there remains a need for a versatile method for recovery of precious metal catalyst waste from non-aqueous reaction effluents, in particular if the reaction effluent contains salt and/or polyether contaminants, or the precious metal is present as a plurality of complexes or in a plurality of valency states, or any combination of such complications occurs.

SUMMARY OF THE INVENTION

The present invention therefore provides a process for recovering a precious metal from a non-aqueous effluent comprising the metal, wherein the effluent is contacted with a reduction agent, the precious metal is deposited onto a carrier, and the precious metal loaded carrier is separated from the effluent.

DESCRIPTION OF THE PREFERRED EMBODIMENTS

Figure 1:
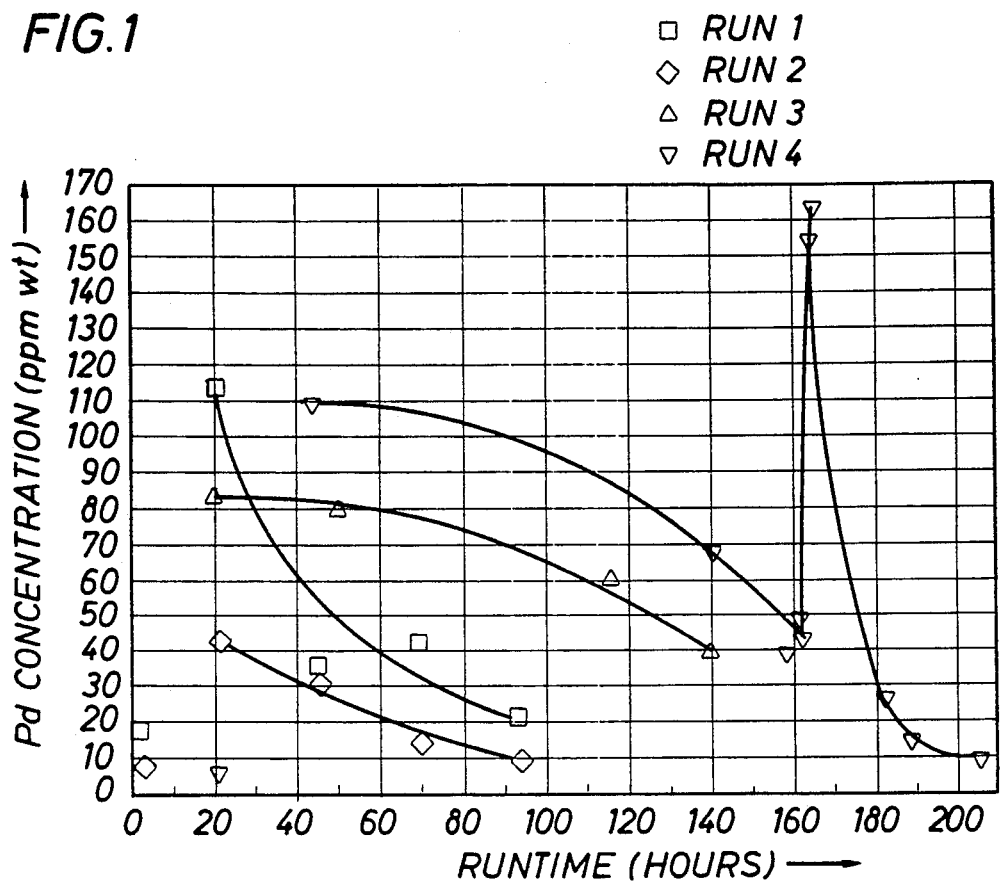
FIGS. 1 and 2 represent the observed results of the experiments, and comprise graphs of the palladium concentration in the effluent of the carrier bed being plotted along the ordinate in units of weight parts per million, versus the run time of experiments plotted along the abscissa in units of hour

Precious metals which can be recovered by the present process include silver and gold, and particularly the precious metals of Group VIII of the Periodic Table, such as ruthenium, osmium, rhodium, iridium, palladium and platinum. Preferred metals to be recovered are rhodium, ruthenium, platinum, and most preferably palladium. The precious metal may be present in the non-aqueous effluent in colloidal and/or dissolved state. The present process is particularly suitable for recovery of dissolved precious metal being present in the form of a plurality of compounds and/or a plurality of valency states, as such effluents are troublesome when using prior recovery methods.

The reaction effluents, from which the precious metals are to be recovered using the process according to the invention, may be constituted by the reaction mixtures, for example as leaving a flow-through reactor, or may be constituted by part of the reaction mixture, for example in the form of a bleed stream from a stripping reactor. Generally, the reactor effluent is in the liquid state. The reactor effluent may directly be subjected to the recovery process of the invention. Alternatively, it may be processed prior to the recovery. For example, the reaction product may be distilled off, and the distillation bottom stream be subjected to the recovery process, or the reaction effluent may be dried for removal of water or filtered, if the specific process requires so. The liquid substance constituting the major liquid component of the non-aqueous reaction effluent may be the reaction solvent or the reaction product, and may contain further liquid substances, noticeably unreacted starting materials. Substantial amounts of water in the non-aqueous reaction effluent don't disturb the present recovery process.

For optimum degrees of recovery of the precious metal, it is preferred that the reaction effluent is substantially free of substances having the ability of solubilizing precious metals, either in the form of their ions or in their zero-valent form. In fact, solubilizing ligands such as organophosphorus or organonitrogen compounds are frequently used as catalyst components due to their ability to prevent the catalytic precious metal from plating out during the catalyzed reaction. The effluents of many reactions will comprise solubilizing ligands such as tertiary phosphines, which tend to disturb the deposition of the precious metal, if they are present in the reaction effluent as treated in concentrations exceeding 5 mol/m$^3$. If the ligands are present in substantial amounts in the reaction effluent directly obtained from the reactor, they may be readily inactivated by oxidation using a suitable oxidant such as an organic peroxide or peroxyacid, molecular oxygen, or preferably hydrogen peroxide. Hydrogen peroxide effects fast and complete oxidation at low temperature when used in stoichiometric amounts, so that any excess of oxidant, which would consume additional reduction agent in the reduction step of the present process, can be avoided. Methods of physical removal of the solubilizing ligands can, of course, also be used, but are more cumbersome. Therefore according to a preferred embodiment of the invention, wherein a precious metal-containing non-aqueous effluent comprising coordinative ligands is processed, the effluent is subjected to oxidation for substantial inactivation of the coordinative ligands prior to contacting with the reduction agent.

The reduction agent to be used in the present process can be any agent having sufficient reductive ability for essentially complete reduction of any cationic precious metal present in the reaction effluent. Practically, it is desirable that the reduction agent will not introduce any interfering chemical compounds requiring later separation, is cheap and readily available and can be safely handled with a minimum of equipment investment. Very suitable reduction agents will be gaseous, and thus are readily handled and contacted with the reaction effluent using well-established technology and equipment, and in their oxidized form will be volatile and therefore readily removed from the reaction effluent. Suitable reduction agents are constituted by lower olefins such as ethylene. It was experimentally observed that carbon monoxide shows excellent performance in the present recovery process, for which reason it is most preferred. The pressure and temperature at which the reduction agents are contacted with the reaction effluent are not critical and may suitably be in the range of about 1 to about 100 bar, preferably about 2 to about 10 bar, and about 50° to about 200° C., preferably about 90° C. to about 150° C.

Any carrier can be used in the process as support for the precious metal to be deposited. For desirable high loadings of the carrier with recoverable precious metal, it is preferred that the carrier is a high surface area carrier. Most preferably, it should have a surface area of at least about 100 m$^2$/g, especially in the range of from about 300 m$^2$/g to about 2500 m$^2$/g. Suitable carrier materials include activated carbon and porous granular plastics or resins. For ease of subsequent processing of the precious metal loaded carrier, it is preferred that the carrier comprises a combustible carbonaceous material. A most suitable and readily available carrier material is activated carbon.

Deposition of the precious metal onto the carrier is effected by any desired way of contacting the same. It may be done batchwise by adding an appropriate amount of carrier to an aliquot of reaction effluent and stirring until a sufficient degree of deposition is achieved. More conveniently, the reaction effluent is continuously passed over a bed of the carrier, whereby the separation of the precious metal loaded carrier from the reaction effluent is facilitated. The bed may be a fixed bed or a fluidized bed, which latter mode allows for a continuous withdrawal of the precious metal loaded carrier. Further technical details of effecting of the contact of carrier and reaction effluent are not critical and could be readily determined by one skilled in the art. For example, a vertically positioned bed can be used with upflow or downflow direction of the reaction effluent stream if the bed is fixed, and preferably upflow direction if the bed is fluidized, as the effluent stream may then act as fluidizing medium.

It is preferred that the reduction and deposition steps of the process of the invention are conducted simultaneously. Thus, any untimely precipitation of the precious metal deteriorating the recovery effectiveness is excluded. It is particularly convenient to conduct the reduction and deposition steps simultaneously by passing a gaseous reduction agent over the carrier bed concurrently with the reaction effluent, for example, in upflow direction or in downflow direction. The temperatures and pressures used in the reduction step are suitable for the deposition step.

The contact of the carrier and the reaction effluent is preferably maintained for a time sufficiently long such that less than 10% of the precious metal content remains in the reaction effluent, so that at least 90% of the precious metal is recovered. More preferably, the reaction effluent leaving the deposition step contains less than 2% of its original precious metal content, so that at least 98% of the precious metal is recovered. The time required for substantially complete deposition of the precious metal is dependant of various factors, such as the type and morphology of the carrier used, the type of precious metal and the nature of the reaction effluent, and conditions of temperature and pressure, and can empirically be determined by one skilled in the art.

As a practical matter, the time for deposition can readily be controlling the space velocity LHSV at which the reaction effluent is passed over the carrier bed. As a rule, space velocities, defined as the volumetric flow rate of the reactor feed stream divided by the empty reactor volume, in the range of about 0.01 h$^{-1}$ to about 2.5 h$^{-1}$ will provide an acceptable balance between the sharper deposition fronts and higher loading levels achievable at low velocity and the more favorable economics of a high velocity. By monitoring the precious metal concentration in the effluent of the carrier bed, the degree of loading of the carrier bed can be readily determined.

Separation of the metal loaded carrier from the reaction effluent is not critical and can be effected by any known suitable separation technique, such as filtration, decantation, centrifugation, or employment of a fixed bed of carrier.

The process of the invention is particularly advantageous for treatment of reaction effluents which, besides the precious metal and solvent and/or product, contain contaminants interfering with the prior known recovery methods. Interfering contaminants are particularly believed to be compounds having phase transferring properties. Such contaminants include dissolved salts and nonionic organic compounds containing polyether moieties, in particular substances comprising bulky molecules or ion pairs having both organophilic and ionophilic tendencies. Contaminant salts particularly causing problems in common recovery methods include phosphonium salts, ammonium salts, pyridinium salts, and other salts having an organic cation, and carboxylate salts, sulfate salts, sulfonate salts, and other salts having an organic anion. Purely inorganic salts, also due to their lower solubility in organic solvents, generally pose fewer problems. Phosphonium salts constitute a source of contamination causing difficulty in precious metal recovery, which may, for example, be found in effluents from carbonylation reactions employing a phosphine supported precious metal catalyst, such as the carbonylation of an olefin in the presence of an alkanol to form alkyl esters of carboxylic esters.

After separation from the reaction effluent, the precious metal loaded carrier contains the metal at much higher concentration, whereby the subsequent reclaiming of the precious metal for reuse is facilitated. Moreover, the solid precious metal loaded carrier is well manageable and can readily be transported to a specialized facility for further work-up of the metal. When using activated carbon as carrier material, loading levels of about 0.15 kg palladium per kg carbon or more can be achieved. The carrier, such as activated carbon, loaded with the precious metal, such as palladium, may be used as such in other heterogeneously catalyzed reactions. Preferably, the precious metal will be reclaimed. If the carrier comprises a combustible carbonaceous material it is preferably combusted leaving a combustion residue essentially consisting of the precious metal and/or its oxides. The residue can readily be purified and optionally converted into marketable compounds using well-known technology.

The invention will be further illustrated by the following examples, wherein a synthetic effluent was used, which resembles the composition of the bleed stream from the preparation of methyl propionate by carbonylation of ethene by reaction with carbon monoxide and methanol in a stripping-type reactor, such as disclosed in EP-A-411721. The synthetic effluent contained methyl propionate (MEP), methanol (MeOH), (3-oxopentyl)triphenylphosphonium methanesulfonate (VEK-salt) as model compound for the phosphonium salts present in the actual bleed stream, triphenylphosphine (TPP), methane sulfonic acid (MeSA) and palladium acetate (PdOAc). The synthetic effluents were contacted just prior to the inlet of the reactor, with a 30% aqueous $H_2O_2$ solution for instantaneous and complete oxidation of triphenylphosphine into triphenylphosphinoxide (TPPO).

VEK-salt was synthesized by dissolving and heating equimolar amounts of vinyl ethyl ketone and TPP in tetrahydrofuran at 70° C. under an inert atmosphere. An equimolar amount of MeSA was then slowly added and the resulting mixture was stirred for one further hour at 75° C. The VEK-salt formed was precipitated by cooling to 0° C. and isolated by filtration, washing and drying.

ILLUSTRATIVE EMBODIMENT

EXAMPLE

A synthetic effluent having the composition indicated in the Table was contacted with $H_2O_2$ just prior to the inlet to a tubular reactor containing a carrier. The amounts of $H_2O_2$ are indicated in the Table as the molar ratio to TTP present in the synthetic effluent.

The reactor had a length of 39 cm and a 25 mm inner diameter, and was constructed from stainless steel and equipped with a central axial thermal well of 7 mm outer diameter. The reactor contained 100 $cm^3$ of carrier, which was an activated carbon having a surface area of 1000 $m^2/g$ (BET, benzene adsorption), a dry apparent bulk density of 460 $kg/m^3$ and a total pore volume of 0.85 $cm^3/g$, which was in the form of whole extrudates (4 mm length, 0.9 mm diameter).

The synthetic effluent was passed through the vertically positioned reactor at the LHSV (basis empty reactor volume) indicated. In runs 1-6, the synthetic effluent was passed in upflow direction through the reactor. In runs 7 and 8 downflow direction was used, in which case 0.1 mm of SiC was added to ensure good wetting of the activated carbon extrudates.

In runs 1-4, which are outside the scope of the invention, no reduction agent was added. In runs 5-8, a gaseous stream of carbon monoxide was added to the synthetic effluent at a molar flow rate indicated in the Table. In the upflow experiments 5 and 6, the carbon monoxide was premixed with the $H_2O_2$ treated synthetic effluent just before the reactor inlet, but, for ensuring good liquid distribution over the carbon bed, liquid and gas were introduced separately in the downflow experiments 7 and 8.

TABLE

| | run no. | | | | | | | |
|---|---|---|---|---|---|---|---|---|
| flow direction | 1 up | 2 up | 3 up | 4 up | 5 up | 6 up | 7 down | 8 down |
| MEP, % wt | 62.8 | 65.6 | 63.5 | 68.0 | 64.5 | 76.1 | 71.6 | 71.6 |
| MeOH, % wt | 27.6 | 21.5 | 25.9 | 25.5 | 24.8 | 13.0 | 17.9 | 17.9 |
| VEK-salt, % wt | 7.8 | 8.2 | 8.8 | 4.7 | 9.0 | 6.8 | 8.9 | 8.9 |
| TPP, mmol/l | 28.3 | 30.0 | 31.8 | 33.7 | 32.3 | 89.8 | 32.2 | 32.2 |
| MeSA, mmol/l | 10.6 | 11.3 | 12.0 | 12.7 | 12.2 | 18.4 | 12.1 | 12.1 |
| PdOAc, mmol/l | 1.06 | 1.13 | 1.20 | 1.27 | 1.22 | 1.90 | 1.22 | 1.21 |
| $H_2O_2$/TPP, mol/mol | 1.84 | 6.83 | 1.23 | 0.97 | 1.04 | 1.09 | 1.07 | 0.95 |
| LHSV, $hour^{-1}$ | .188 | .120 | .105 | .155 | .115 | .115 | .104 | .110 |
| CO flow, mol/$10^6$s | — | — | — | — | 3.10 | 8.68 | 1.74 | 1.08 |

Figure 2:
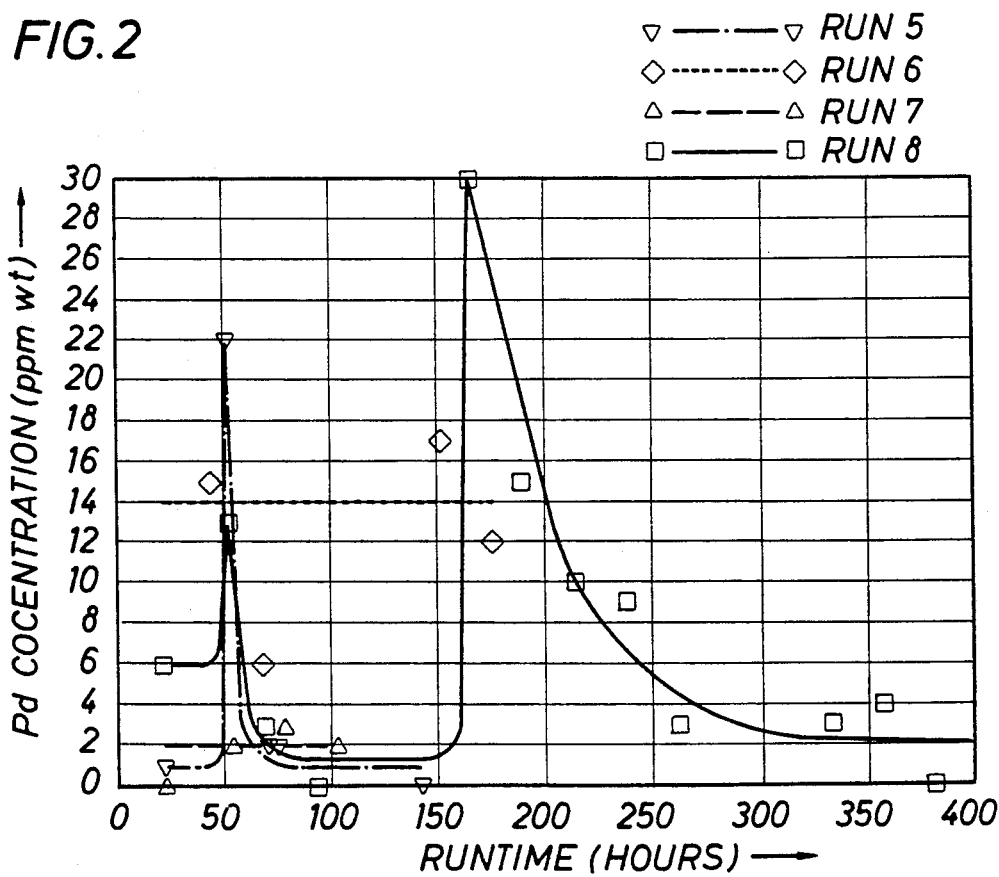

The concentration of palladium in the effluent from the activated carbon bed was periodically measured by means of atomic absorption spectrometry over running times varying from about 150 to about 400 hours for the several runs. The observed palladium concentrations expressed in weight part per million are represented in FIG. 1 for runs 1 to 4 outside the scope of the invention and in FIG. 2 for runs 5 to 8, which are in accordance with the invention. The sharp peaks seen in the graphs represent temporarily reduced palladium deposition resulting from short-duration disturbances caused by failure of the back-pressure valve or by an increase of the LHSV. It will be appreciated that using the method of the invention, the initial palladium concentration in the reaction effluent of about 200 ppm weight was generally reduced to about 2 ppm, with run 8 showing that effective deposition could be maintained over prolonged periods of time. In runs 1 to 4, the deposition was an order of magnitude less effective.

What is claimed is:

1. A process for recovering a precious metal from a non-aqueous effluent comprising the metal, which comprises contacting the effluent with a reduction agent, depositing the precious metal onto a carrier, and separating the precious metal loaded carrier from the effluent.

2. The process as claimed in claim 1, wherein the precious metal is selected from the group consisting of rhodium, ruthenium, platinum, palladium and mixtures thereof.

3. The process as claimed in claim 2, wherein the precious metal is palladium.

4. The process as claimed in claim 1, wherein the carrier has a surface area of at least 100 $m^2/g$.

5. The process as claimed in claim 4, wherein the carrier comprises a carbonaceous combustible material.

6. The process of claim 5, wherein the carrier is activated carbon.

7. The process as claimed in claim 1, wherein the reduction agent is carbon monoxide.

8. The process as claimed in claim 1, wherein at least 90% of the precious metal is recovered from the non-aqueous effluent.

9. The process of claim 8, wherein at least 98% of the precious metal is recovered from the non-aqueous effluent.

10. The process as claimed in claim 1, wherein the reaction effluent contains dissolved salt and polyether contaminants.

11. The process as claimed in claim 1, wherein the precious metal-containing non-aqueous effluent comprises coordinative ligands and the effluent is subjected to oxidation for substantial inactivation of the coordinative ligands prior to contacting with the reduction agent.

12. The process as claimed in claim 4, wherein in said process further comprises the steps of combusting the carbonaceous combustible carrier loaded with precious metal, and reclaiming the precious metal or a compound thereof from the combustion residue.

* * * * *